Jan. 2, 1940.  E. V. MITCHELL  2,185,898
EXTENSIBLE SUN VISOR
Filed April 15, 1938
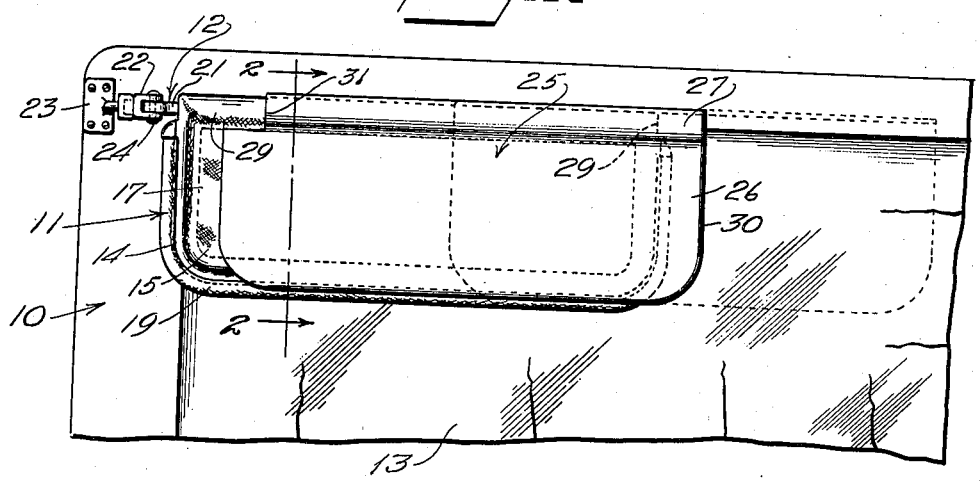
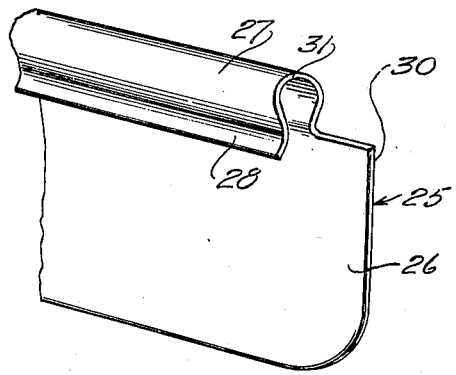
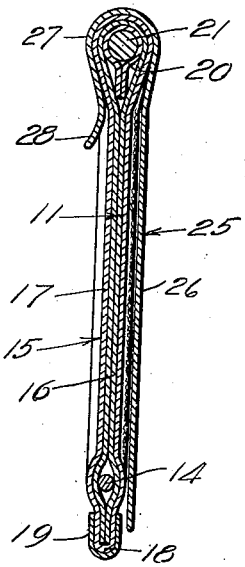
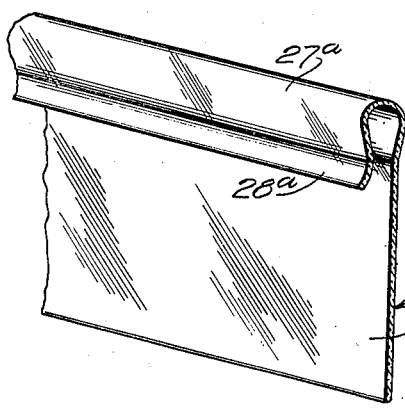
Inventor
Ebb V. Mitchell
By Kimmel & Crowell,
Attorneys Patented Jan. 2, 1940

2,185,898

UNITED STATES PATENT OFFICE 2,185,898

EXTENSIBLE SUN VISOR

Ebb V. Mitchell, Abilene, Tex.

Application April 15, 1938, Serial No. 202,335

2 Claims. (Cl. 296—97)

This invention relates to sun visors for motor vehicles and more particularly to an attachment for a sun visor.

An object of this invention is to provide an extensible attachment which may be readily positioned on the present construction of a sun visor which is so constructed that it may be readily moved to an operative or inoperative position along the length of the present visor construction.

Another object of this invention is to provide an extensible attachment for a sun visor which may be constructed out of metal or other opaque material or if desired may be constructed out of substantially transparent material which has light ray absorbing characteristics.

A further object of this invention is to provide in combination a swingable visor which is positioned on a stationary part of the motor vehicle and an extensible visor structure which when in retracted position is adapted to lie flat against the visor structure but which when in extended position may be moved longitudinally of the main visor structure with the present parts of the main visor structure supporting the extensible attachment.

A still further object of this invention is to provide an extensible visor of this character which is exceedingly simple in construction so that it can be manufactured and sold at a relatively small cost.

Still another object of this invention is to provide an extensible visor structure of this kind which has a body plate of a size coincident with the size of the main visor and which is provided with integral supporting means adapted to slidably engage the upper edge of the main visor.

To the foregoing objects and others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:

Figure 1 is a detail rear elevation of a visor structure having an extensible attachment constructed according to an embodiment of this invention mounted thereon, Figure 2 is an enlarged sectional view taken on the line 2—2 of Figure 1, Figure 3 is a fragmentary perspective view of the visor attachment, and Figure 4 is a fragmentary perspective view partly in section of a substantially transparent light ray absorbing attachment.

Referring to the drawing, the numeral 10 designates generally the frame or body portion of a vehicle having a windshield 13 secured thereto. A visor structure generally designated as 11 is secured to a swingable bracket structure 12 which in turn is secured to the frame or body portion 10 of the vehicle. The visor 11 comprises a frame structure 14 substantially rectangular in side elevation which is formed in the present instance of wire or the like. A non-transparent body 15 is secured to the frame 14 and in the present instance comprises an inner relatively stiff part 16 to which an outer fabric covering 17 is secured. The inner member 16 engages about the frame 14 and on three sides thereof extends outwardly of the frame 14 as at 18. A binding 19 is secured as by stitches or the like to the extended portions 18 of the stiffening member 16. The upper portion of the frame includes a sleeve 20 which engages a supporting rod 21 forming part of the bracket 12. The sleeve 20 frictionally engages the rod 21 so that the visor structure 11 can be frictionally maintained in either a vertical, a horizontal or a position inclined to the vertical.

The rod 21 is fixedly secured to a stationary bracket 22 which is fastened by means of a plate 23 to the frame 10 of the vehicle. This bracket comprising the rod 21, bracket member 22, securing plate 23 and pivotal pin 24 is of conventional construction and the same is true of the visor structure 11.

In order to provide a means whereby the visor 11 may be extended longitudinally I have provided an extensible visor structure generally designated as 25. This extensible visor 25 comprises a visor plate 26 of opaque material and this material may be in the form of a sheet of metal which has a configuration coincident with the configuration of the visor 11. A sleeve 27 is secured to the upper edge of the plate 26 and this sleeve 27 is preferably split longitudinally and one edge thereof is secured to the plate 26 with the other edge thereof free. The free longitudinal edge of the supporting sleeve 27 is provided with an out-turned lip 28 which is adapted to engage on the side of the visor 11 opposite from the plate 26. The sleeve 27 is constructed by rolling or reverting one longitudinal edge of the plate 26 and then bending the free edge thereof outwardly so as to form the out-turned lip 28.

In Figure 4, there is disclosed a slightly modified form of this extension visor structure wherein there is disclosed a visor 25a constructed of transparent material in the form of a cellulose product which may be treated or colored so as to absorb the light rays and thus prevent glare of bright lights striking one side thereof. This visor member 25a comprises a plate 26a which has one longitudinal edge thereof overturned so as to provide a longitudinally disposed sleeve 27a which is split longitudinally and is provided with an out-turned lip 28a.

In the use of this extensible visor the main visor 11 is attached to the frame or body of the vehicle 10 adjacent the driver and in a position whereby the visor 11 may be swung to the front portion of the vehicle where it will be positioned substantially parallel with the windshield 13 or swung to a position along side the driver. The extensible member 25 is slipped over the rounded upper edge portion 29 of the visor 11 and in a retracted position the plate 26 is positioned with the ends thereof substantially flush with the ends of the main visor 11. The extensible visor 26 preferably has a length substantially equal to the length of the main visor 11. When it is desired to increase the length of the visor, the extensible member 25 is pulled longitudinally of the rolled portion 29 of the visor 11 as shown in dotted lines in Figure 1. In this position the split sleeve 27 will support the extensible visor 25 in the selected position and it will, of course, be understood that the main visor may with the extensible visor 25 in either a retracted or extended position may be disposed in either a vertical or a position inclined to the vertical.

An attachment according to this invention can be readily combined with or slipped over the present construction of the visor at present in use on a motor vehicle, and it will be understood that the length and width of the extensible visor 25 is substantially equal to the length and width of the main or normal visor at present forming a part of the motor vehicle structure. Where the extensible visor 25 is formed of sheet metal, the end edges are preferably rolled over as at 30 and the longitudinal edges are also rolled over so that the sheet metal will not cut or injure a person contacting such edges or ends. This rolled over portion 30 also provides a means for stiffening the sheet metal so that it will maintain a flat or straight form.

In order that the visor 25 may be moved inwardly relative to the bracket, the sleeve 27 and the tongue 28 terminate at their inner ends inwardly of the adjacent edge of the main visor portion 26 as indicated at 31. This will permit the sliding of the visor 25 as viewed in Figure 1 to the left beyond the inner or left hand edge of the visor 11 so that no glaring light rays will come between the inner edge of the visor 11 and the adjacent portion of the vehicle body 10.

What I claim is:

1. An extensible attachment for visors of that type including a substantially rectangular body having a hollow rounded upper portion revoluble on and angularly adjustable relative to a suspension rod pivoted at its outer end to a fixed bracket, said attachment adapted to have the major portion thereof normally disposed throughout in abutting relation with respect to one of the side faces of said body and capable of being bodily adjusted with and independently adjusted longitudinally selectively in opposite directions relative to said face to selectively extend from the ends of said body for increasing the length of the visor, said attachment comprising a rectangular plate corresponding in length to the length of and permanently abutting said face, said plate being of a width to extend from the bottom of said rounded portion and to terminate in close proximity to the bottom of said body, and a sleeve carried by and disposed in lengthwise relation with respect to said plate for permanently bearing against the front, top and rear of said upper portion whereby the attachment is secured with the visor to bodily move with said body on the angularly adjusting of the latter, said sleeve being resilient formed throughout its bottom with a wide split, one edge of said split merging into the top of said plate, said sleeve being of a length to extend from the inner end to a point removed inwardly from the outer end of said plate to provide a clearance for the latter relative to the pivoted end of said rod and the said bracket when said plate is adjusted to extend from the outer end of said body.

2. In combination, a stationary bracket, a horizontal rod extending inwardly from and having its outer end arranged in said bracket, a vertical pivot for the rod extending through the bracket and outer end of said rod, a visor including a substantially rectangular body having a hollow rounded upper portion revoluble on and angularly adjustable relative to said rod, a rectangular plate corresponding in length to and permanently positioned against one side face of said body, a horizontally disposed resilient sleeve encompassing and frictionally binding against said hollow portion, said sleeve being formed throughout its bottom with a wide slit having one of its edges merging into the top of said plate, said sleeve and plate being bodily movable with said visor on the angularly adjusting of the latter and independently bodily adjusted longitudinally selectively in opposite directions relative to said face to selectively extend from the ends of said body to increase the length of the visor, and said sleeve being of a length to extend from the inner end to a point removed inwardly from the outer end of said plate to provide a clearance for the latter, relative to the pivoted end of the rod and the said bracket when the plate is extended outwardly to increase the length of the body of the visor.

EBB V. MITCHELL.